A. E. CRANSTON.
KNOTTER.
APPLICATION FILED SEPT. 6, 1919.
1,374,283.
Patented Apr. 12, 1921.
3 SHEETS—SHEET 1.
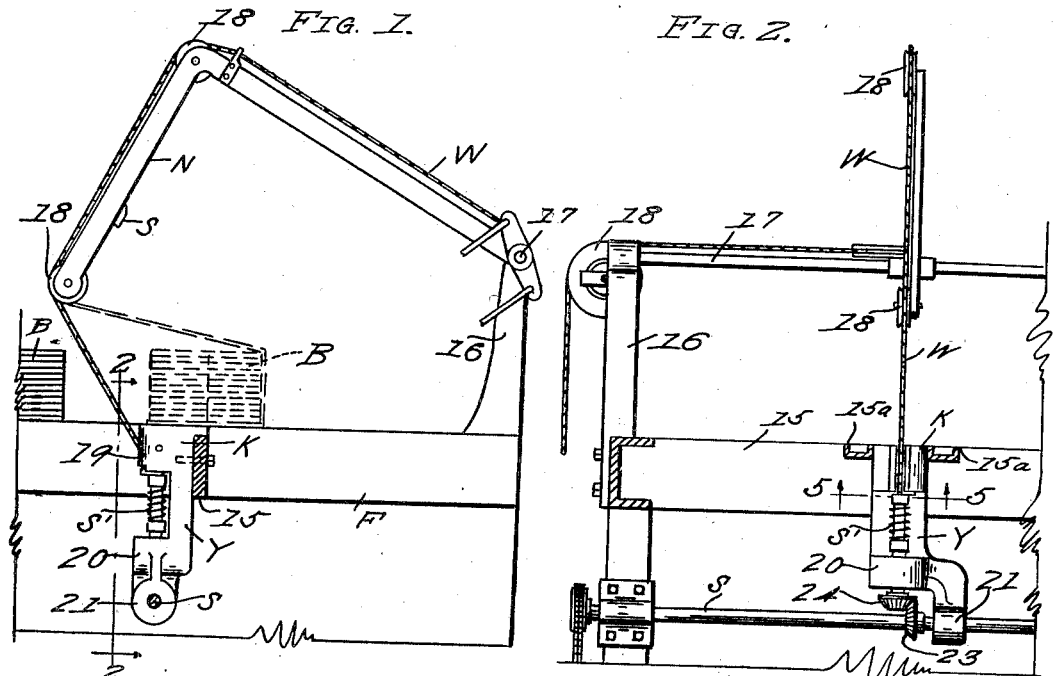
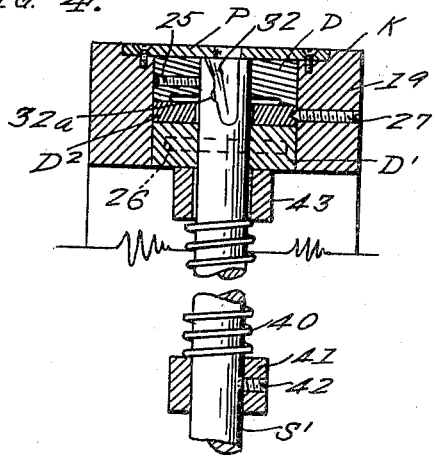
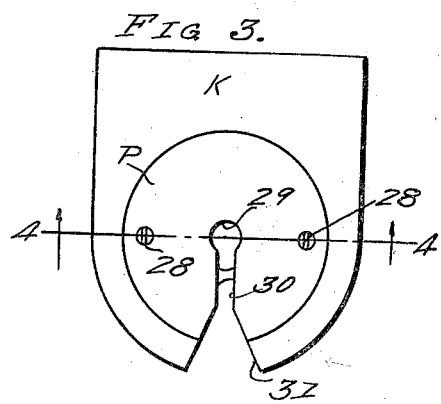
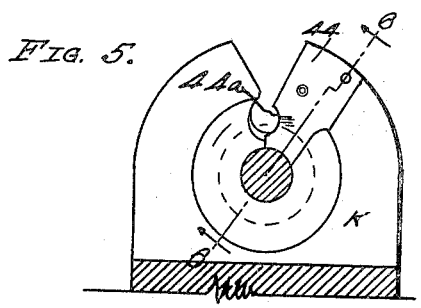
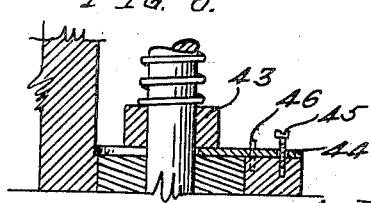
INVENTOR
A. E. CRANSTON,
BY
ATTORNEY A. E. CRANSTON.
KNOTTER.
APPLICATION FILED SEPT. 6, 1919.
1,374,283.
Patented Apr. 12, 1921.
3 SHEETS—SHEET 2.
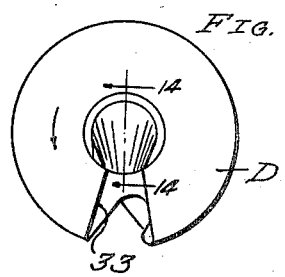
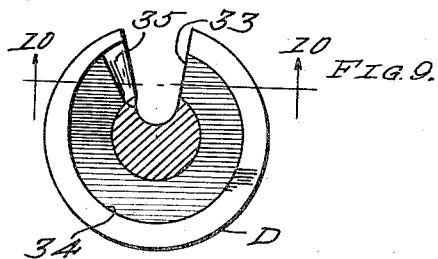
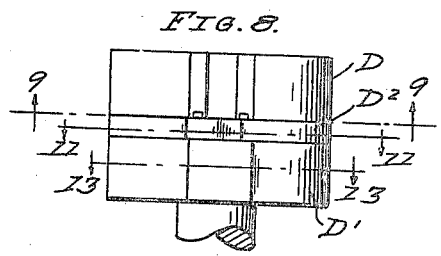
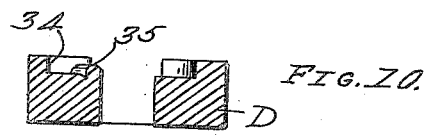
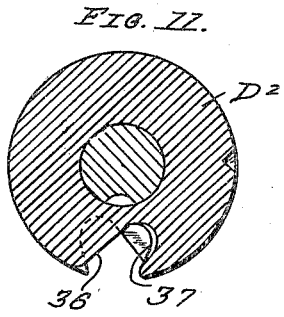
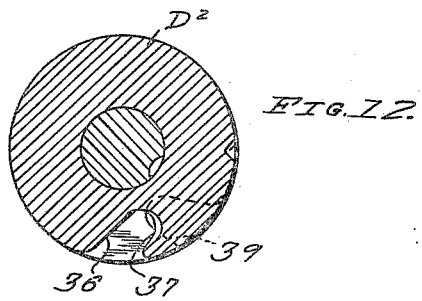
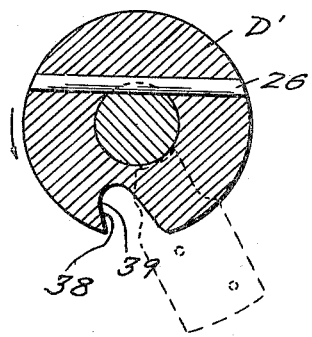
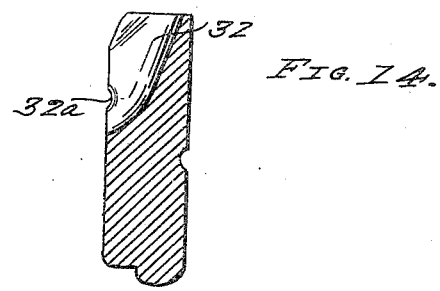
INVENTOR
A. E. CRANSTON,
BY
ATTORNEY

A. E. CRANSTON.
KNOTTER.
APPLICATION FILED SEPT. 6, 1919.

Patented Apr. 12, 1921.

INVENTOR
A. E. CRANSTON,
BY
ATTORNEY

UNITED STATES PATENT OFFICE.

ALBERT EARL CRANSTON, OF SPOKANE, WASHINGTON.

KNOTTER.

1,374,283.   Specification of Letters Patent.   Patented Apr. 12, 1921.

Application filed September 6, 1919. Serial No. 322,086.

*To all whom it may concern:*

Be it known that I, ALBERT EARL CRANSTON, a citizen of the United States, and a resident of Spokane, in the county of Spokane and State of Washington, have invented certain new and useful Improvements in Knotters, of which the following is a specification.

My invention relates to knotters of the revoluble head type which are used for twisting the severed ends of a loop of wire subsequent to the wrapping of a bundle of shingles, staves, or the like for securing the same together for shipment. My invention is particularly adapted for use in the binding machine embodied in my copending application Serial No. 321,643, filed November 24, 1919, although it is to be understood that the invention is not limited to this adaptation but can be employed in binding machines of widely varying types.

It is a purpose of my invention to simplify the construction and operation of the knotter embodied in my co-pending application, Serial No. 269,840, filed September 4, 1919, and to provide novel means for frictionally gripping the severed ends of the tying wire leading from the wire supply.

It is also a purpose of my invention to provide a knotter in which wires of widely varying gages can be used with equal effectiveness by changing one element of the device and constructing the knotter to permit the ready substitution of such element.

I will describe one form of knotter embodying my invention, and the elements of one form of binding machine which are necessary to a clear understanding of the operation of the invention.

Figure 15:
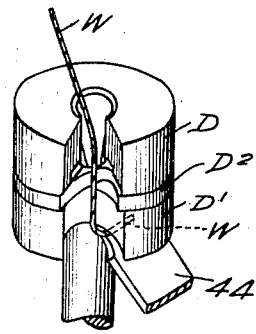
Figure 16:
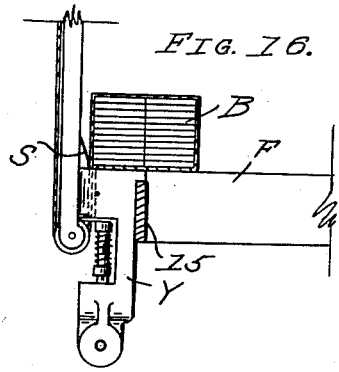
Figure 17:
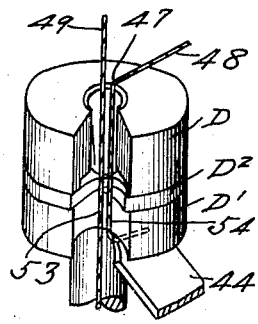
Figure 18:
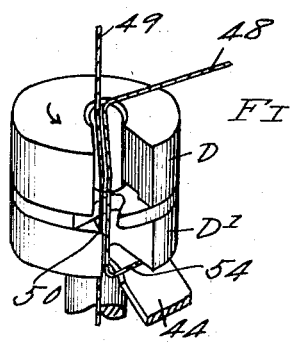
Figure 19:
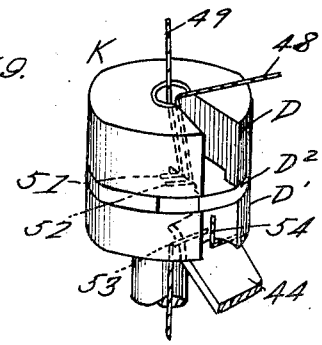
Figure 20:
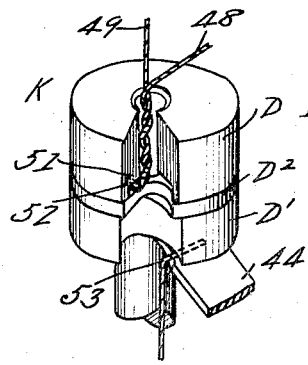

In the accompanying drawings:

Figure 1 is a view in side elevation of my device showing it as adapted for use in connection with my improved binding machine;

Fig. 2 is a section on line 2—2 of Fig. 1;
Fig. 3 is a plan view of the knotter;
Fig. 4 is a section on line 4—4 of Fig. 3;
Fig. 5 is an enlarged section on line 5—5 of Fig. 2;
Fig. 6 is a section on line 6—6 of Fig. 5;
Fig. 7 is a plan view of the revoluble head comprising a portion of my device;
Fig. 8 is a front elevation of the revoluble head;
Fig. 9 is a section on line 9—9 of Fig. 8;
Fig. 10 is a section on line 10—10 of Fig. 9;
Fig. 11 is a section on line 11—11 of Fig. 8;
Fig. 12 is a section similar to Fig. 11 but showing a slight change in the relative position of parts;
Fig. 13 is a section on line 13—13 of Fig. 8;
Fig. 14 is a section on line 14—14 of Fig. 7;
Fig. 15 is a perspective view of the knotter head and threading of wire therein before the looping operation takes place;
Fig. 16 is a view showing the method of looping the wire, which, while not a part of the present invention will clarify later description of operation;
Fig. 17 is a view similar to Fig. 15 but showing the position of the wire after the loop has been formed;
Fig. 18 shows the position of parts after a slight revoluble motion has been imparted to the head;
Fig. 19 shows the position of the wire after it has been severed and is ready for the twisting operation;
Fig. 20 shows the twist completed and the severed supply wire rethreaded for the succeeding looping action.

Similar reference characters refer to similar parts in each of the several views.

Referring specifically to the drawings, and particularly to Figs. 1 and 2 I have here shown one form of binding machine which comprises a frame designated generally at F and a cross bar 15 to which is attached my improved form of knotter indicated generally at K. As shown in Fig. 2, the knotter K is arranged between channeled portions 15ª of the bar 15, which receive the two endless chains comprised in a feeding conveyer (not shown). Supported on the frame F is one of a pair of uprights 16 in which is journaled a shaft 17. Fixed to the shaft 17 is needle N which is designed to support and manipulate tying wire W to effect a threading of the wire in the knotter K, as will be hereinafter described. The wire W is movably supported on the needle N by idlers or pulleys 18 arranged at suitable points to permit the proper feeding of the wire from a source of supply (not shown). Suitable mechanism (not shown) is employed to actuate the shaft 17 to effect a movement of the needle N from an elevated position as shown in Fig. 1 to a lowered position as shown in Fig. 16 or vise versa, and in such manner that the needle remains at rest in one extreme position for a predetermined interval before moving to the other extreme position. The lowered position of the needle N is determined by a stop S which is adapted to abut the upper end of the knotter K. The purpose of this particular movement will be clearly understood when describing the operation of the knotter K.

The knotter K which forms the subject-matter of my invention comprises a vertically disposed substantially U-shaped yoke Y including an upper head 19, an intermediate head 20, and a lower head 21 formed on the latter as shown in Figs. 1 and 2. The head 21 receives and forms a bearing for a drive shaft S which is suitably journaled at its end on the frame F. The heads 19 and 20 form bearings for a vertically disposed operating shaft S' which is adapted to be driven by the shaft S through bevel gears 23 and 24 fixed to shafts S and S', respectively. As shown in Fig. 4, the head 19 is formed with an opening which greatly exceeds the diameter of the adjacent end of the operating shaft S' for the purpose of snugly receiving three rings D, $D^1$ and $D^2$. Upper ring D and lower ring $D^1$ are fixed to the shaft S by a set screw 25 and a pin 26, respectively, while the intermediate disk $D^2$ is interposed between the two and loosely embraces the shaft so as not to rotate therewith. The disk $D^2$ is locked against movement by a set screw 27 which threadedly engages the head 19 and seats within a socket formed in the periphery of the disk, as shown in Figs. 4 and 12.

As shown in Figs. 3 and 4, the upper side of the head 19 is recessed to receive a cover and guide plate P, which is secured in position by screws 28. This plate P is centrally formed with an aperture 29 which merges into a radially extending slot 30, such slot registering with a V-shaped slot 31 formed in the head 19. As shown in Figs. 4 and 14, the upper end portion of the shaft S' is formed with a groove or recess 32 of gradually increasing depth from the upper end downwardly and of arcuate contour in cross-section. One edge of the groove 32 is notched as at $32^a$ for a purpose to be hereinafter described, while the top of the groove in the starting position of the shaft S' registers with the aperture 29 in plate P.

Referring now to Fig. 7 it will be seen that the upper disk D is formed with a radially extending slot 33 which extends completely through the ring as shown. As shown in Fig. 9, the under side of ring D is recessed to provide an annular groove 34. The groove 34 is of uniform depth for a major portion of its length while the remaining portion which is that portion adjacent one of its ends, is gradually deepened toward the end of the groove where a wire-gripping lug 35 is formed.

In Figs. 11 and 12, the construction of the ring $D^2$ is shown as being provided with a substantially J-shaped peripheral recess or groove 36 having one lower edge thereof projected to provide a cutting edge 37. As the ring $D^2$ is stationary the groove 36 at all times registers with the slot 31 of head 19. As shown in Figs. 11, 12, and 13, ring D' is also formed with a similar groove 38 which is disposed in reverse relation to the groove 36 and is provided with a cutting edge 39 which coacts with the cutting edge 37 for severing the wire when the ring D' is rotated in the direction of the arrow Fig. 13.

Referring again to Fig. 4, I have here shown a coiled retractile spring 40 surrounding the shaft S' and having the lower end thereof bearing against a collar 41 fixed to the shaft by a screw 42, while its upper end engages and biases a gripping ring 43 upwardly on the shaft toward the head 19.

As shown in Figs. 5 and 6, the ring 43 bears against a gripping plate 44 which is secured to the underside of the head 19 by a screw 45 and properly positioned with relation to the ring 43 by a pin 46. The inner end of the plate 44 is curved to conform to the curvature of the shaft S', while adjacent the curved end, one side edge is recessed as at $44^a$ for a purpose which will be hereinafter described.

The operation of the knotter K and the manner in which the needle N coöperates with the same in the tying of a bundle of material into a shook will be best understood from a consideration of Figs. 1, and 15 to 20, inclusive. In the normal position of the knotter K, the rings D and $D^1$ occupy such positions that the grooves register with the groove of ring $D^2$, as shown in Fig. 15. Before the machine is set into operation, the wire W is placed within the grooves of the rings and shaft S' and its free end is manually inserted between the confronting faces of the plate 44 and the ring $D^1$ which is readily accomplished by depressing collar 43 against the action of the spring 40. Upon releasing the collar 43, the spring 40 acts to frictionally hold the wire end W securely between the two members and from now on the insertion of the wire after each tying operation is accomplished automatically until the supply of wire is exhausted. With wire W in proper position, within the knotter K as shown in Fig. 15, and the needle N in the elevated position, that portion of the wire between the needle and knotter is disposed directly in the path of movement of a bundle of material B, as shown in Fig. 1. When the machine starts to operate, the bundle B is moved from the position shown in full lines in Fig. 1 to that shown in dash lines, and during this movement, the wire W is engaged by the bundle and laid beneath and over the forward end of the bundle, it being understood that the plate 44 will not release its hold on the wire end, thereby causing the necessary length of wire to be fed from the source of supply. In its forward movement bundle B will bend the wire W over the upper ring D as at 47 Fig. 17, so that portion 48 will lie against the top face of the plate P when the bundle reaches its final position above the knotter K. The bundle B having reached its final position, the needle N now descends to the position shown in Fig. 16 whereupon the lower idler 18 and the stop S forces portion 49 of the wire W into the position shown in Fig. 17 so that it will now be seen by reference to Fig. 16 that wire W now completely encompasses the bundle. In this lowered position of the needle, the stop S completely closes the outer end of the slot 30 so that the wires are confined within the aperture 29, which, as a consequence, holds the wires centrally with respect to the head 19 so that the twisting of the wires takes place centrally of the knotter. As a result of this function, the wires are prevented from slipping radially toward the periphery of the twisting disks. This slippage, if permitted, would result in a disengagement of the wires from the disks and a consequent failure to knot. Up to the present time no action has taken place on the part of the knotter K, but as soon as the needle N reaches its lowermost position, shaft S' and consequently rings D and D¹ now commence to revolve in the direction of the arrow Fig. 18, whereupon it will be seen that portions 48 and 49 will first be severed at 50 by the coaction of cutting edges 37 and 39 as a result of the fact that ring D² is held stationary. As shown in Fig. 19, upon further rotation of rings D and D¹ those portions of wires 48 and 49 which formerly lay between the upper and lower faces of ring D², and which are designated 51 and 52 in Figs. 19 and 20, will be drawn between the upper face of ring D² and the gripping lug 35 so as to extend into the groove 34. The space between ring D² and lug 35 is such that a wire of a given gage must be forced into and frictionally held between the two. By providing a plurality of rings D with varying sized lugs 35, one may interchange the rings to accommodate wires of varying gages.

Simultaneously with the drawing of the wire ends 51 and 52 between the rings D and D², that portion 53 of wire 49 which extends between the upper and lower faces of ring D¹ is frictionally drawn between the confronting faces of ring D¹ and plate 44 and frictionally held therebetween under the action of spring 40 acting on the collar 43. In the meantime, ring D¹ has revolved sufficiently to cause groove 39 to clear plate 44 thereby allowing that portion 54 of wire 48 to drop to the floor as scrap. Irrespective of the number of times ring D¹ revolves thereafter end 53 will still be retained in the position of Fig. 20 until the binding operation is repeated.

The ends 51 and 52 being held stationary within the knotter, and the rest of the wire loop being held stationary on bundle B, the rotation of the knotter will consequently twist the ends of the wires 48 and 49 as shown in Fig. 20, thereby forming a twisted knot. As the twisting continues, ends 51 and 52 will be gradually withdrawn from groove 34 so that when the knot is complete and the next bundle is pushed forward, bundle B will in its consequent forward movement entirely withdraw the twisted knot from the knotter.

The wire may be given as many twists as is desirable, the number being dependent only on the number of revolutions imparted to the knotter and the length of ends 51 and 52 which depends on the thickness of ring D². It has been found that for binding shooks, four twists are sufficient and consequently the knotter makes but four revolutions before it is automatically stopped.

After the knotter has made about three revolutions, needle N is automatically returned to the position shown in Fig. 1 and wire 49 will then assume the position of wire 48 in Fig. 15, while end 53 will be held in the position of end 54. It will thus be seen that the knotter is each time automatically rethreaded each time the wire is severed, thereby allowing for the immediate repetition of the wire-tying action without requiring manual operation or adjustment at any time.

As previously described the groove 34 is extended entirely around ring C in order that any small bits of wire or other obstruction which may enter will not clog the groove to prevent the insertion of ends 51 and 52 but will, instead force their way out through the unobstructed end.

Although I have herein described only one form of knotter embodying my invention, it is to be understood that various changes and modifications may be made herein without departing from the spirit of the invention and spirit and scope of the appended claims.

I claim:

1. A knotter, comprising a pair of superposed rotatable members, a stationary member interposed between the rotatable members, the upper rotatable member having its lower face formed with a groove having both ends open and a lug formed in the groove, and a shaft for rotating the rotatable members, said shaft and members being grooved and notched for receiving two stretches of wire and causing the stretches to be cut by the lower and intermediate members when the lower member is rotated, and for causing a gripping of the ends of the stretches between the lug and the upper face of the stationary member when the upper member is rotated to effect a twisting of the stretches.

2. A knotter, comprising a stationary member, a movable member contiguous to the stationary member, and having a groove formed on the confronting face thereof and a recess communicating with the ends of the groove, a recess formed in the stationary member, and a lug formed on the movable member at one end of said groove.

3. A knotter, comprising a stationary member and a movable member, means carried by the movable member and coöperating with the confronting face of the stationary member for receiving the two ends of a wire and gripping the same between the members so that they will move with the movable member to effect a twisting of the wire ends and an ultimate releasing of the same, a second movable member associated with the stationary member to effect a cutting of the wire ends prior to the gripping operation, and a plate biased into engagement with the second movable member for the purpose described.

4. A knotter, comprising a stationary member and a movable member, means carried by the movable member and coöperating with the confronting face of the stationary member for receiving the two ends of a wire and gripping the same between the members so that they will move with the movable member to effect a twisting of the wire ends and an ultimate releasing of the same, a second movable member associated with the stationary member to effect a cutting of the wire ends prior to the gripping operation, a plate below the second movable member, a movable collar, a spring bearing on the collar for biasing the plate toward the second movable member, and a spindle for supporting said collar and spring.

5. A knotter, comprising a yoke, including a head, a shaft journaled in the yoke and extending into said head, superposed members fixed to the shaft and working within said head, a stationary member between the two members, a collar movable on said shaft below the lower member, a spring on the shaft and normally forcing the collar toward the lower member, a plate interposed between the collar and lower member, and slots formed in all of said members and shaft for the purpose described.

6. In combination, a knotter comprising a stationary member, a movable member associated with the stationary member to effect a cutting of the ends of a wire when the movable member is moved, a plate biased toward the movable member for retaining one of the wire ends in cutting position, and a needle movable to hold one of the wire ends in position for cutting, and to replace the other wire end into position for cutting after the wire ends have been cut.

7. A knotter, comprising a yoke including a head, a grooved shaft journaled in the yoke and extending into said head, a pair of split rings fixed to said shaft and having a sliding fit within said head, a disk between said rings and fixed to said head, said disk being formed with a groove having one lower edge of one wall shaped to provide a cutting edge, a cutting edge formed on the lower ring and adapted to coact with the other cutting edge when the shaft is rotated, a groove formed in the lower face of the upper ring and coextensive in circumference therewith, a lug formed at one end of the last groove, a plate associated with the lower face of the lower ring to effect a gripping of a wire, and means on the shaft for biasing the plate toward the lower ring.

8. In combination, a knotter comprising, rotatable members, a stationary member, means for rotating the rotatable members, coacting means formed on all the members to effect a cutting and twisting of the ends of a wire, a needle movable to introduce the wire into the members, a guide plate associated with the members for guiding the wire into the members, and a stop carried by said needle for limiting its movement in one direction, said stop being adapted to engage said guide plate for preventing displacement of the wire from the members.

9. In combination, a knotter comprising, a shaft, rotatable members fixed to said shaft, a stationary member between the rotatable members, means for rotating said shaft, coacting means formed on all the members to effect a cutting and twisting of the ends of a wire, a needle movable to introduce the wire into the members, a guide plate associated with the members for guiding the wire into the members, said shaft being formed with a groove, and a stop carried by said needle for limiting its movement in one direction, said stop being adapted to engage said guide plate so as to confine the wire within said plate and the groove of said shaft.

10. A knotter comprising, a stationary member, a pair of movable members coacting with the stationary member to receive and grip the ends of a loop of wire in a manner to effect a twisting and cutting thereof, and a plate biased toward one of the movable members and coacting therewith to frictionally hold one of the cut ends of the wire within the knotter when said movable member is moved.

11. In combination, a wire knotting device comprising, wire cutting and twisting means, a plate biased into engagement with said means for holding the free end of a wire supply within the knotter after a stretch of the wire has been looped and cut, and a needle movable to replace the wire supply in position in the knotter for cutting and twisting after the ends of the loop have been cut.

ALBERT EARL CRANSTON.